UNITED STATES PATENT OFFICE.

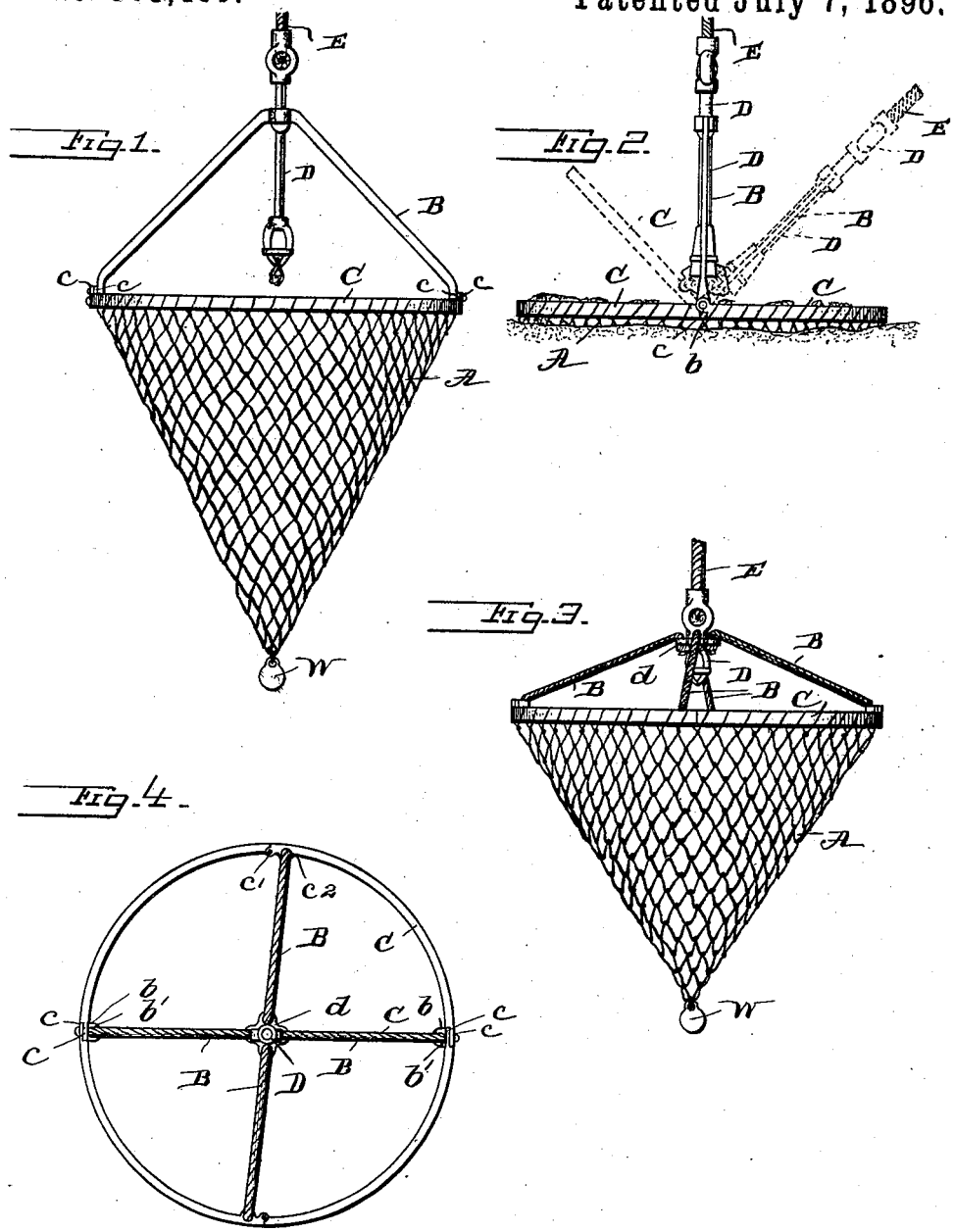

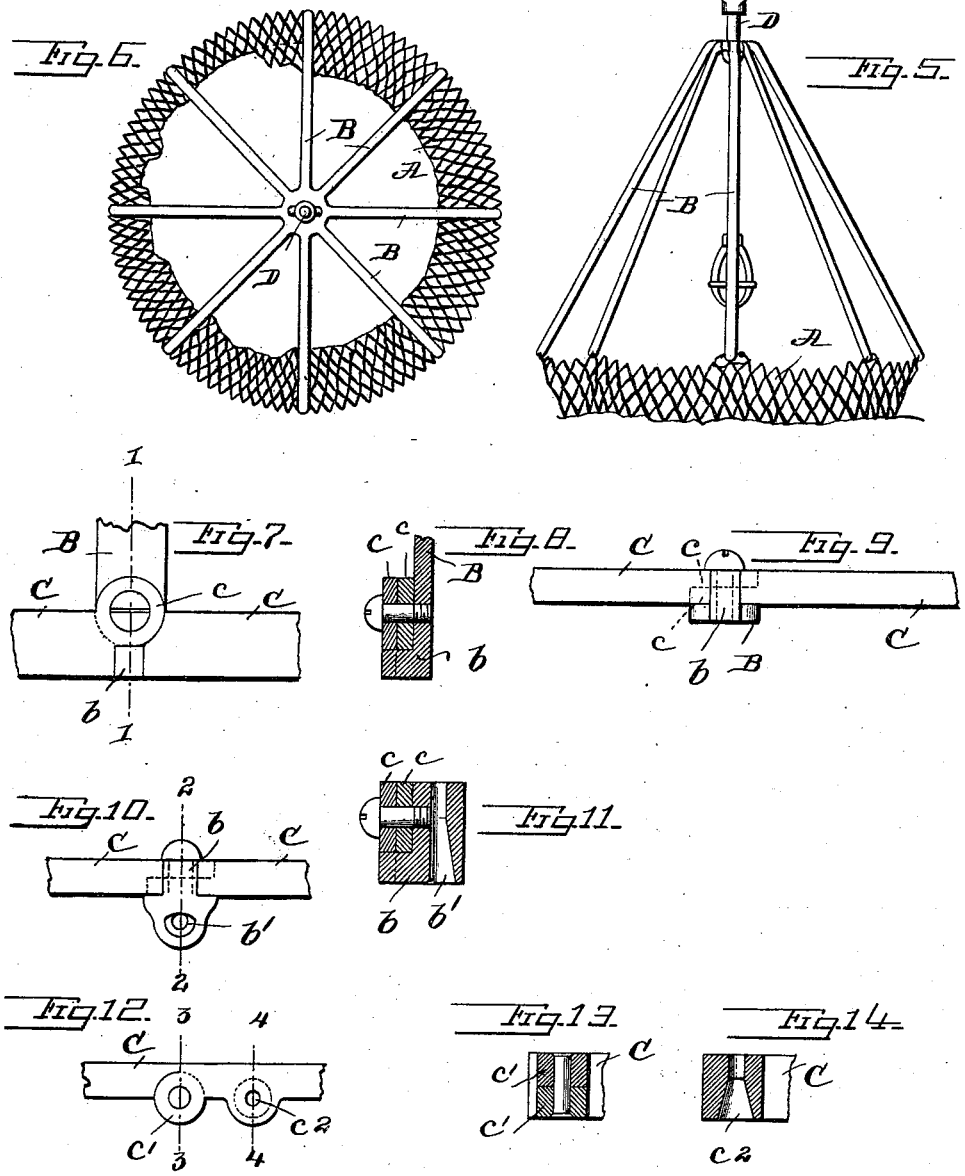

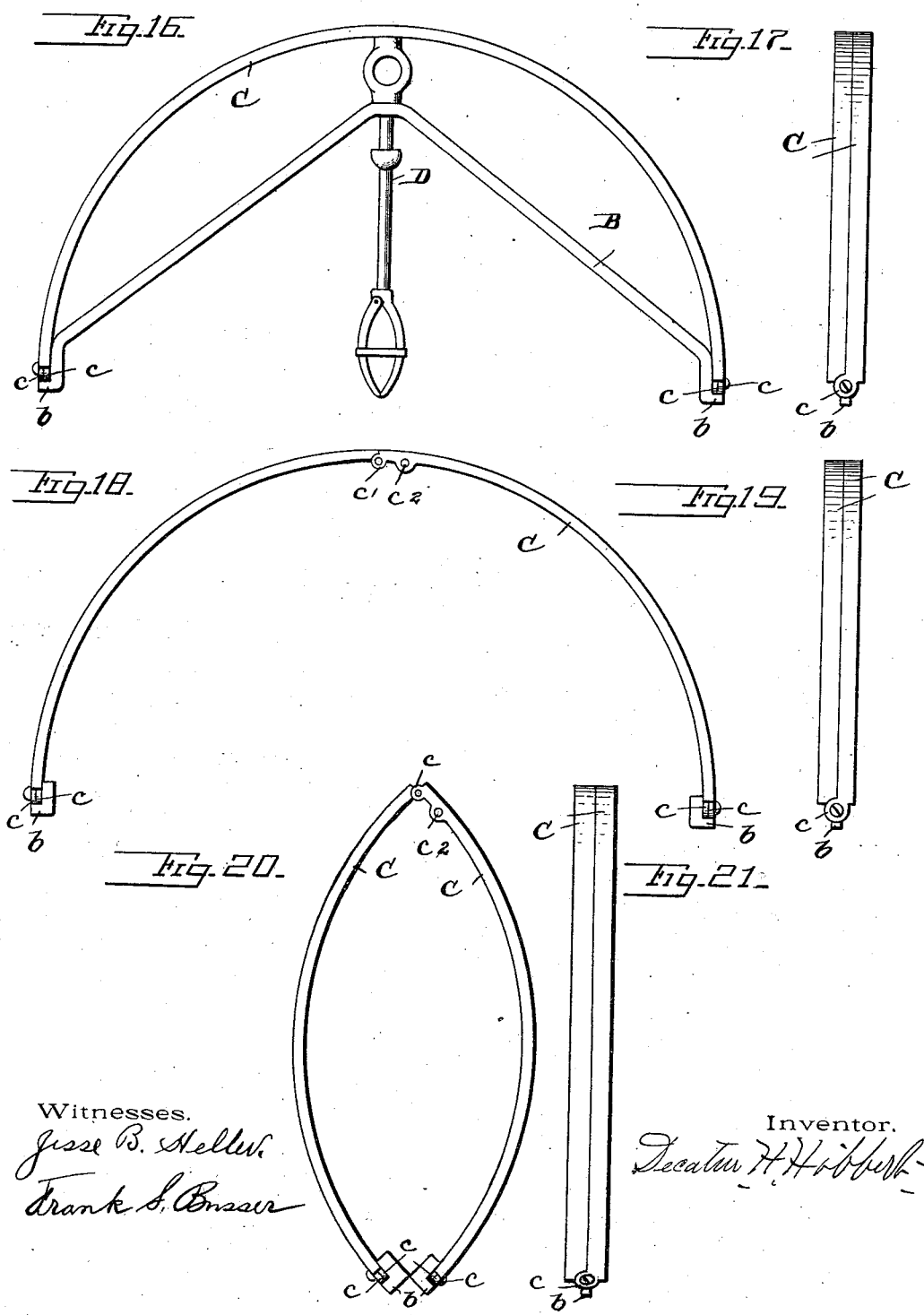

DECATUR H. HIBBERT, OF MEDIA, PENNSYLVANIA.

FISH AND CRAB NET.

SPECIFICATION forming part of Letters Patent No. 563,486, dated July 7, 1896.

Application filed December 31, 1895. Serial No. 573,895. (No model.)

*To all whom it may concern:*

Be it known that I, DECATUR H. HIBBERT, a citizen of the United States, residing at Media, county of Delaware, and State of Pennsylvania, have invented a new and useful Improvement in Fish and Crab Nets, of which the following is a full, clear, and exact description, reference being had to the accompanying drawings, which form a part of this specification.

My invention relates to fish and crab nets, particularly to that described and claimed in my application Serial No. 559,246, filed August 14, 1895, which consists of a net, a supporting-ring in two parts, a bail, and a relatively-movable bait-holder.

It consists of certain improvements in details of construction whereby the following results are accomplished: first, folding the frame into a small compass; second, constructing the frame so that when the bail is moved on its pivot toward one of the semirings, the opposite semiring will have a corresponding movement and remain substantially at a right angle to the plane of the bail; third, maintaining the bail, when the supporting-ring lies flat, in a vertical position; fourth, keeping the net proper in an open position when lowering and raising the same, and for laying hold of the net when removing the fish, and, fifth, limiting the horizontal movement of the bait-holder relative to the bail.

In the drawings, Figure 1 is a side elevation of the net and my improved supporting-frame therefor, showing the net in the position it assumes when lifted from the ground. Fig. 2 is a similar view showing the net folded and the frame resting on the ground and in dotted lines the position of the bail and one of the semirings when the bail is tilted. Fig. 3 is a view similar to Fig. 1, showing a modified construction of bail. Fig. 4 is a plan view of Fig. 3. Fig. 5 is a view similar to Fig. 1, but devoid of a ring. Fig. 6 is a plan view of Fig. 5. Fig. 7 is a view showing the joint between the bail and ring in the construction of Fig. 1. Fig. 8 is a section on the line 1 1 of Fig. 7. Fig. 9 is a bottom plan view of Fig. 7. Fig. 10 is a bottom plan view of joint $x$ between the semirings of Fig. 4. Fig. 11 is a section on the line 2 2, Fig. 10. Fig. 12 is a plan view of the joint $y$ between the two quarter-rings of one of the semirings of Fig. 5, showing also the means for securing the bail-rope. Fig. 13 is a section on line 3 3, and Fig. 14 a section on the line 4 4, Fig. 12. Fig. 15 is a side view, partly in section, of portion of bait-holder and bail, showing connection between the same. Fig. 16 is a side view of the construction of Fig. 1, showing the semirings folded up, for convenience in carrying, in line with the bail. Fig. 17 is an end view of Fig. 16. Fig. 18 is a side view of construction of Fig. 4, minus the bail-rope and bait-holder, showing the semirings folded against each other. Fig. 19 is an end view of Fig. 18. Fig. 20 is a side view of the quarter-rings forming the semiring shown in Fig. 18 folded toward each other. Fig. 21 is an end view of Fig. 20.

In the figures, A is the net; C, the ring; B, the bail; D, the bait-holder; E, the hand-rope secured to the bait-holder.

Referring first to the construction shown in Figs. 1, 2, 7, 8, and 9, $b$ is the lug cast on the bail B and forming part of the joint between the bail and the ring. The lug is L-shaped, and lies on the outside and under and between the semirings. The joint between the semirings is an ordinary pocket-rule joint. The overlapping circular ends $c$ $c$ of the semirings are provided with screw-holes in line with each other and in line with a screw-hole in the lug $b$. A screw passing through these holes holds the parts together. The advantage of this construction is that when the bail is tilted toward one of the semirings it will tilt up at right angles to it and other semiring. This is desirable, inasmuch as it often happens that the net when in use is not immediately beneath the operator. In the absence of a construction of this kind, and with the net obliquely below the operator, a pull upon the rope drags the net along in a horizontal direction, and, the ring lying flat, there is nothing to prevent the escape of the fish; but if the semiring farthest from the operator is caused to assume a position at right angles to the bail, as in my construction, one side of the net will be brought above the fish and the fish entangled in the net at the first pull. This same joint is shown in Figs. 3, 4, 10, and 11, the only difference being that the lug $b$ is provided with a hole $b'$, through which the lower end of one of the rope-bails passes, the end being knotted after it is pulled through to hold it in place.

W is a weight secured to the bottom of the net for keeping the same in an open position when raising and lowering the same, and which may be grasped by the hand when it is desired to turn over the net to remove the fish.

When the ropes are used in place of a bail, a plate $d$ is slipped over the bait-holder, the plate having orifices corresponding in number to the ropes, through which the ropes are passed and then knotted, and two of the semirings are provided with similar orifices $c^2$ (shown in Figs. 4, 12, and 14) to secure the lower ends of those ropes which are not secured to the lugs.

In order to enable me to fold my net into a compact shape, I have adopted the construction shown in Figs. 3, 4, 12, 13, and 16 to 21. I have already described the construction of the joint between the two semirings. The joint between the two quarter-rings is also an ordinary pocket-rule joint, the adjacent overlapping circular ends $c'$ $c'$ having screw-holes in line with each other. In folding up the frame each semiring is folded toward and in line with the bail. Figs. 16 and 17 show the construction of Fig. 1 so folded, while Figs. 18 and 19 show the construction of Figs. 3 and 4, minus the bail and bait-holder, similarly folded. The latter, which is divided into quarter-rings, is again folded into the shape shown in Figs. 20 and 21, each quarter-ring being folded toward its adjacent quarter-ring. The whole apparatus can thus be folded into a very small compass for convenience in carrying, the operation requiring but a moment of time.

It is also desirable to limit the horizontal swinging movement of the bait-holder with respect to the bail and ring, for the reason that when this movement is unrestricted the nibbling of a fish is sometimes not detected until the bait-holder has swung over to such an extent that the greater part of the fish lies without the ring C. The fish is therefore thrown outside of the net when the same is drawn up after the "bite" is detected. To remedy this, I have shown in Fig. 15 an enlarged view of the construction of the bail for the reception of the bait-holder, the same being enlarged from Figs. 1 and 2. The bail is provided with an orifice $b^2$, countersunk on both sides, its middle diameter being about equal to the diameter of the bait-holder rod. The bait-holder can thus have but a limited movement in its bearing without binding.

In the construction shown in Figs. 3 and 4 the plate $d$ is provided with a similar orifice.

Figs. 5 and 6 show a modified construction of net wherein the ring C is dispensed with and multiple bails used, to the lower ends of which are fastened the nets.

I have referred in the specification to the ropes B as "bail-ropes," for the reason that the ropes and plate $d$ shown in Figs. 3 and 4 and the stiff metal bails B shown in Figs. 1, 2, 4, and 5 are deemed to be mechanical equivalents, and by the term "bail" used in the claim I mean any construction, such as the supporting-ropes of Figs. 3 and 4 and the multiple bails of Figs. 5 and 6, which serve to support or aid in supporting the net A.

Having now fully described my invention, what I claim, and desire to protect by Letters Patent, is—

1. In a fish-net, the combination with a net of a bail for supporting the same, having an orifice, and a bait-holder rod extending through the orifice, the orifice being countersunk on both sides as described, and having a middle diameter of substantially the thickness of said rod.

2. The combination with a net, of a ring for supporting the same made in two parts or halves, and a bail, the bail having a rigid connection with each of said parts when moved away from it and a pivotal connection therewith when moved toward it.

3. The combination with a net, of a ring for supporting the same in two parts or halves, and a bail, the bail having a rigid connection with one of said parts and a pivotal connection with the other of said parts when moved in either direction from its central position.

4. In a fish-net, a ring formed in two parts or halves, a bail sustaining said ring, lugs $b$ on said bail extending between adjacent ends of the said halves, and a pivotal connection between the bail and the adjacent ends of said halves, the adjacent ends of said halves abutting against said lugs when the ring is in its extended position.

5. In a fish-net, a ring formed in two parts or halves, a bail sustaining said ring, lugs $b$ on said bail extending between adjacent ends of the said halves, and a pivotal connection between the bail and the adjacent ends of said halves, the adjacent ends of said halves abutting against said lugs when the ring is in its extended position, each of said halves being formed in two parts pivotally connected together.

In testimony of which invention I have hereunto set my hand.

DECATUR H. HIBBERT.

Witnesses:
FRANK S. BUSSER,
CAROL. H. DESHONG.